(12) United States Patent
Sudoh

(10) Patent No.: US 7,006,308 B2
(45) Date of Patent: Feb. 28, 2006

(54) RETAINER, EXPOSURE APPARATUS, AND DEVICE FABRICATION METHOD

(75) Inventor: Yuji Sudoh, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 33 days.

(21) Appl. No.: 10/851,955

(22) Filed: May 21, 2004

(65) Prior Publication Data

US 2004/0257679 A1    Dec. 23, 2004

(30) Foreign Application Priority Data

May 21, 2003    (JP)    ............... 2003-144096

(51) Int. Cl.
   *G02B 7/02*    (2006.01)
   *G03B 17/00*   (2006.01)
(52) U.S. Cl. .................. 359/819; 359/811; 359/818; 396/529
(58) Field of Classification Search ............... 359/819, 359/811, 818, 830, 813; 396/529; 248/637
   See application file for complete search history.

(56) References Cited

U.S. PATENT DOCUMENTS

| 6,239,924 B1 | 5/2001 | Watson et al. ............. 359/819 |
| 6,525,888 B1 * | 2/2003 | Schletterer .................. 359/819 |
| 6,556,364 B1 * | 4/2003 | Meehan et al. ............ 359/822 |

FOREIGN PATENT DOCUMENTS

| JP | 2001-74991 | 3/2001 |
| JP | 2001-284226 | 10/2001 |

* cited by examiner

*Primary Examiner*—Timothy Thompson
(74) *Attorney, Agent, or Firm*—Morgan & Finnegan, L.L.P.

(57) ABSTRACT

A retainer includes a plurality of support members for supporting an optical element, and a plurality of elastic members arranged between the plurality of support members, each elastic member applying an elastic force to the optical element in a direction perpendicular to a gravity direction.

4 Claims, 12 Drawing Sheets

RETAINER, EXPOSURE APPARATUS, AND DEVICE FABRICATION METHOD

This application claims a benefit of foreign priority based on Japanese Patent Application No. 2003-144096, filed on May 21, 2003, which is hereby incorporated by reference herein in its entirety as if fully set forth herein.

BACKGROUND OF THE INVENTION

The present invention relates generally to precision machines for mounting an optical element, and more particularly to a projection optical system in an exposure apparatus, etc. The present invention is suitable, for example, for a retainer that holds an optical element for a more precise imaging relationship in an exposure apparatus in projecting and exposing an image on an original sheet, such as a mask or reticle (these terms are used interchangeably in this application) onto an object, such as a single crystal substrate for a semiconductor wafer, a glass plate for a liquid crystal display (LCD). The exposure apparatus is used to fabricate a semiconductor device, an image pick-up device (such as a CCD), and a thin film magnetic head.

The fabrication of a device using the lithography technique has employed a projection exposure apparatus that uses a projection optical system to project a circuit pattern formed on a mask onto a wafer and the like, thereby transferring the circuit pattern. The projection optical system enables diffracted beams from the circuit pattern to interfere on the wafer and the like, so as to form an image.

The devices to be mounted on electronic apparatuses should be highly integrated to meet recent demands for miniaturization and low profile of electronic apparatuses, and finer circuit patterns to be transferred or higher resolution have been demanded increasingly. A short wavelength of a light source and an increased numerical aperture ("NA") in a projection optical system are effective to the high resolution as well as a reduced aberration in the projection optical system.

An optical element, such as a lens and a mirror, when deforming in an projection optical system causes aberration because an optical path refracts before and after the deformation and light that is supposed to form an image at one point does not converge on one point. The aberration causes a positional offset and short-circuits a circuit pattern on a wafer. On the other hand, a wider pattern size to prevent short-circuiting is contradictory to a fine process.

Therefore, a projection optical system with small aberration should hold its optical element(s) without changing a shape and a position relative to the optical axis of the optical element in the projection optical system so as to maximize the original optical performance of the optical element. In particular, the projection lens tends to have a larger caliber and a larger lens capacity due to the recent high NA in the projection optical system, and easily deforms by its own weight. In addition, diffraction optical elements, which have been eagerly studied recently, also tend to deform due to its thinness.

Accordingly, Japanese Patent Application, Publication No. 2001-284226 proposes, as shown in FIG. 11, a retainer 1000 that fixes a lens 1300 using three or more (e.g., thirty in the embodiment) lens support points 1200 formed on a cell 1100, and springs 1400 for pressing the lens 1300 from a side opposite to the lens support points 1200. A compression force is designed or calculated to the extent that a lens of a low breaking strength, such as a lens made of calcium fluoride ($CaF_2$), does not get damaged. Here, FIG. 11 is an exploded perspective view of the exemplary conventional retainer 1000.

Similarly, Japanese Patent Application, Publication No. 2001-74991 (corresponding to U.S. Pat. No. 6,239,924) proposes, as shown in FIG. 12, a retainer 2000 that fixes a lens installed onto seats on three flex mount parts 2200 that are radially arranged at regular intervals on an inner circumference on a cell 2100, and a spring member with small rigidity in a non-optical axis direction for applying a compression force to the lens from the top of the lens according to the lens shape. Soft mount parts 2300 dispersedly support the lens among the flex mount parts 2200 so as to minimize the gravity deflection and so as not to excessively restrain the positioning of the lens. Here, FIG. 12 is a schematic top transparent view showing the exemplary conventional retainer 2000.

However, Japanese Patent Application, Publication No. 2001-284226 does not consider the flatness of the lens support points 1200 and lens deformation. For example, when the heights of the lens support points 1200 deviate, only three points among them support points 1200 even when there are thirty or more lens. Therefore, the portion except the above three support points does not contact the lens but receives forces from the springs 1400, causing the lens to deform. Thus, this reference has a difficulty in realizing a projection optical system with little aberration due to such a lens's deformation.

On the other hand, Japanese Patent Application, Publication No. 2001-74991 has a careful structure to a lens deformation or distortion, but requires forces opposite to those applied by the flex mount parts at three flex mount parts 2200 so as to apply a compression force to prevent the lateral offset of the lens. This causes the lens to incur a large load from the spring members of the flex mount parts 2200. This causes the large birefringence and possibly breaks the lens, and has a difficulty in realization.

BRIEF SUMMARY OF THE INVENTION

Accordingly, it is an exemplified object of the present invention to provide a retainer, an exposure apparatus, a device fabrication method which may provide desired optical performance by reducing aberration due to a deformation and a positional offset of an optical element which otherwise deteriorates the imaging performance.

A retainer according to another aspect of the present invention includes a plurality of support members for supporting an optical element, and a plurality of elastic members arranged between the plurality of support members, each elastic member applying an elastic force to the optical element in a direction perpendicular to the gravity direction.

An exposure apparatus of another aspect of the present invention includes the above retainer, and an optical system for exposing a pattern formed on a mask or reticle onto an object through the optical element held by the retainer.

A device fabrication method of another aspect of the present invention includes the steps of exposing a pattern on a mask, onto an object by using the above exposure apparatus, and developing the exposed object.

Other objects and further features of the present invention will become readily apparent from the following description of the embodiments with reference to accompanying drawings.

DETAILED DESCRIPTION OF THE PREFERRED EMBODIMENTS

Figure 1:
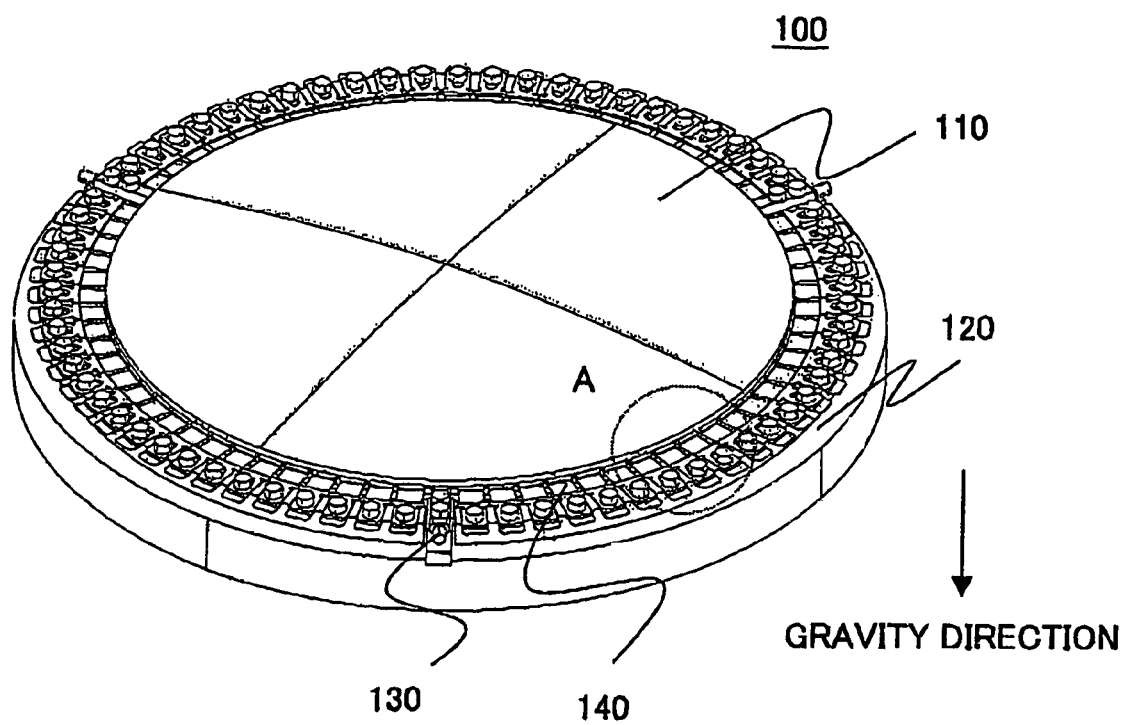
FIG. 1 is a schematic sectional and perspective view of a retainer of one embodiment according to the present invention applicable to a projection optical system in an exposure apparatus.

Referring now to accompanying drawings, a description will be given of an illustrative retainer 100 and exposure apparatus 200, of the present invention. However, the present invention is not limited to these embodiments, and each element may be replaced within a scope of this invention. For example, although the retainer 100 is applied to a projection optical system 230 in the exposure apparatus 200 in the instant embodiment, it is applicable to an illumination optical system 214 in the exposure apparatus 200 and other known optical systems. Here, FIG. 1 is a schematic sectional and perspective view of the inventive retainer applicable to the projection optical system in the exposure apparatus 200. The gravity direction and the antigravity direction (i.e., a direction opposing to the gravity direction) are parallel to the optical axis of the optical element 110, as shown in an arrow direction in FIG. 1. When the optical axis of the optical element is parallel to the gravity and anti-gravity directions, the gravity deformation of the optical element becomes the largest and the gravity deformation often affects the optical performance. Therefore, the instant embodiment applies the present invention to a case where the optical axis of the optical element is parallel to the gravity and anti-gravity directions.

As best shown in FIG. 1, the retainer 100 includes a cell member 120, the support parts 130, and an elastic member 140, and holds the optical element 110.

Figure 2:
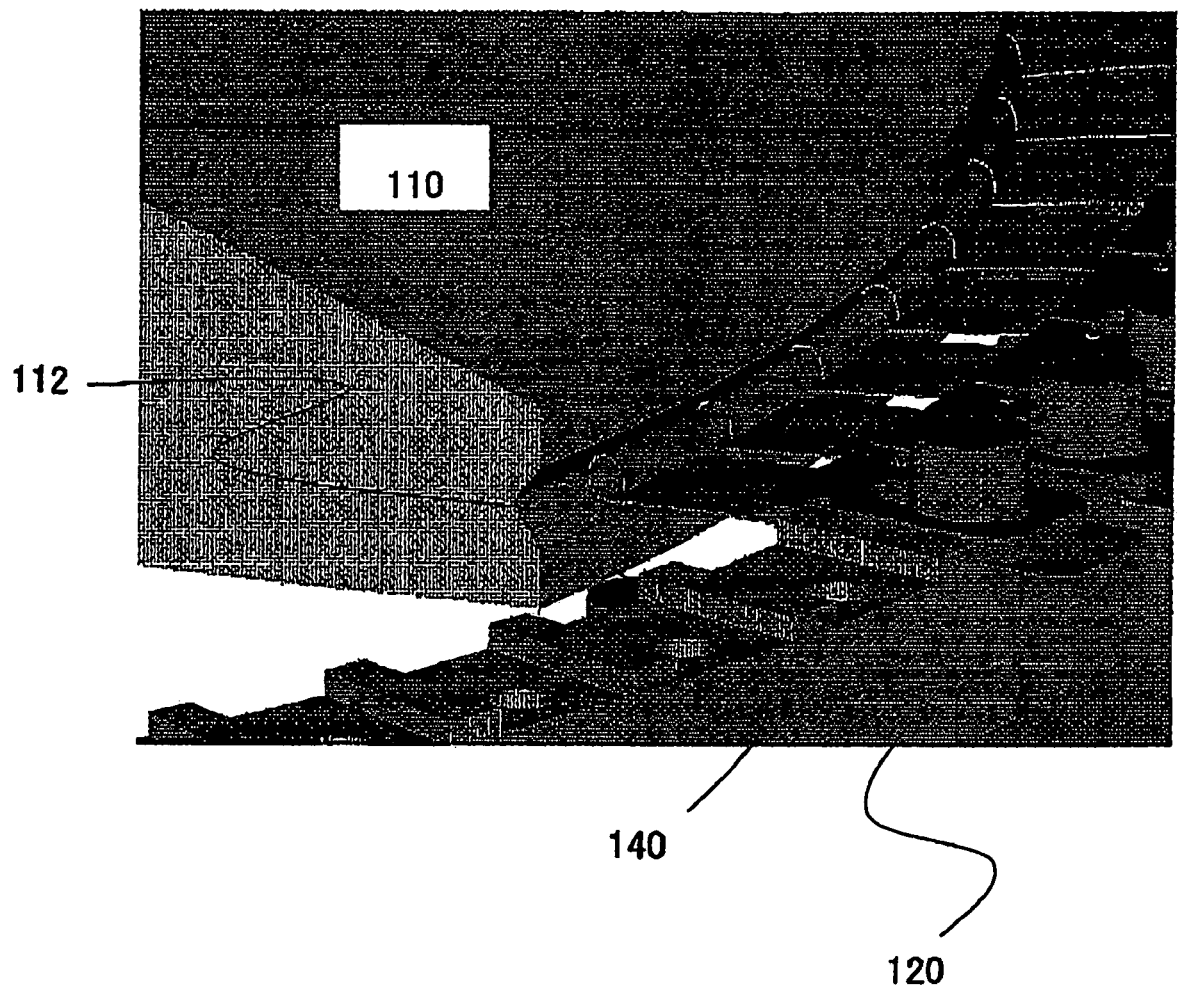
FIG. 2 is an enlarged typical view of principal part of an optical member at its outer circumference side surface as indicated by a broken line A in FIG. 1.

The optical element 110 has a sectionally V-shaped groove 112 on its outer circumference side surface, and is mounted on the support parts 130, which will be described later. FIG. 2 is an enlarged typical view of principal part of an optical member 110 at its outer circumference side surface (or the groove 112) as indicated by a broken line A in FIG. 1. The optical element 110 images light using reflections, refractions, diffractions, etc. The optical element 110 includes, for example, a lens, a parallel plate glass, a prism, a mirror, and a Fresnel zone plate, a kinoform, a binary optics, a hologram, and other diffraction optical elements. While the instant embodiment supports the optical element 110 on the support members 130 via the groove 112, the optical element 110 may be placed on and supported by the support members 130. In placing the optical element 110 on the support members 130, the optical element 110 is compressed against the side opposite to the support members 130 when viewed from the optical element. In addition to the support members 130, a compression member is provided to fix a position in an optical-axis (or vertical) direction of the optical element 110. The groove 112 has, but is not limited to a V-shaped section, and may have a circular section and another shape.

The cell member 120 mounts three support parts 130 for supporting the optical element 110 at three points, and the elastic member 140, which will be described later. The cell member 120 is a ring member formed around the optical axis, and made of a material having a coefficient of linear expansion substantially equal to that of the optical element 110. For example, when the optical element 110 is a quartz lens, the cell uses a super-inver material. This structure may prevent the external force from deforming or stressing the optical element 110 via the support members 130 and the elastic members 140 due to a relative displacement resulting from different linear expansions between the optical element 110 and the cell member 120.

Figure 3:
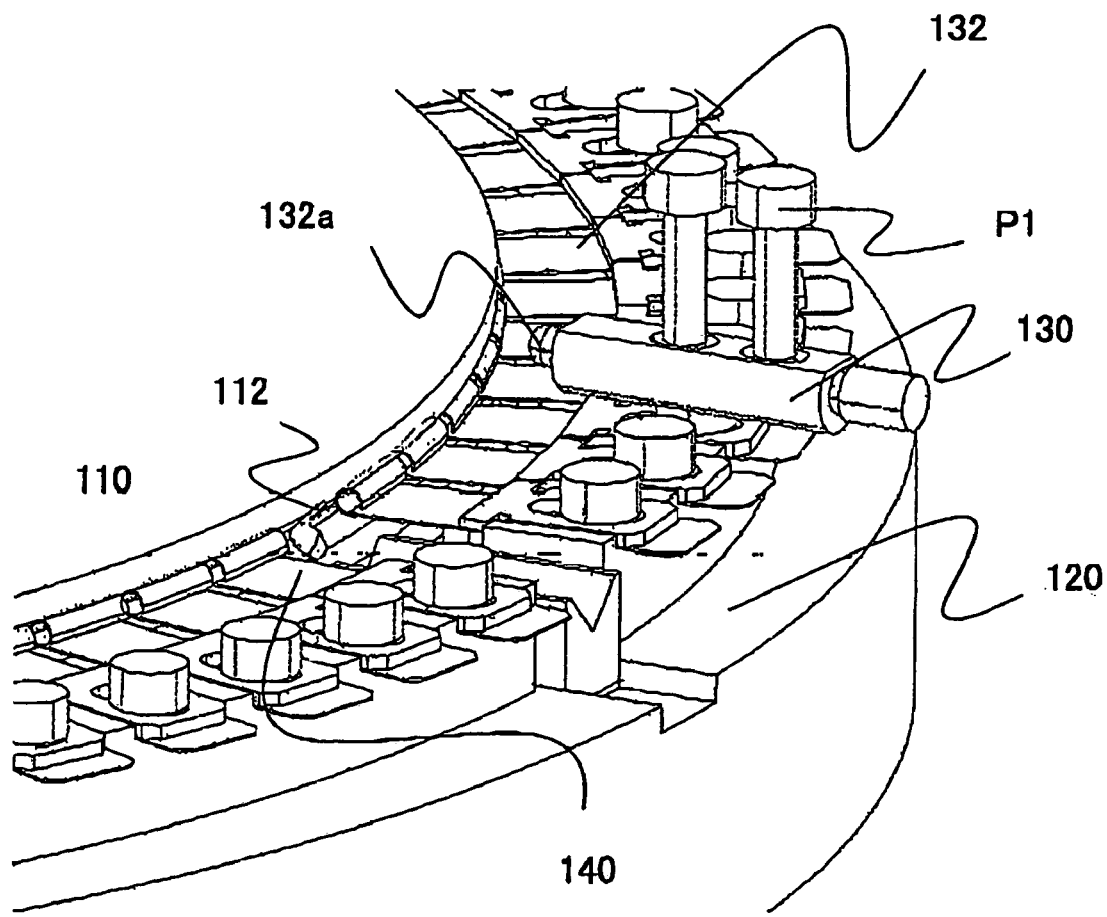
FIG. 3 is an enlarged exploded perspective view of a support member shown in FIG. 1.
Figure 4:
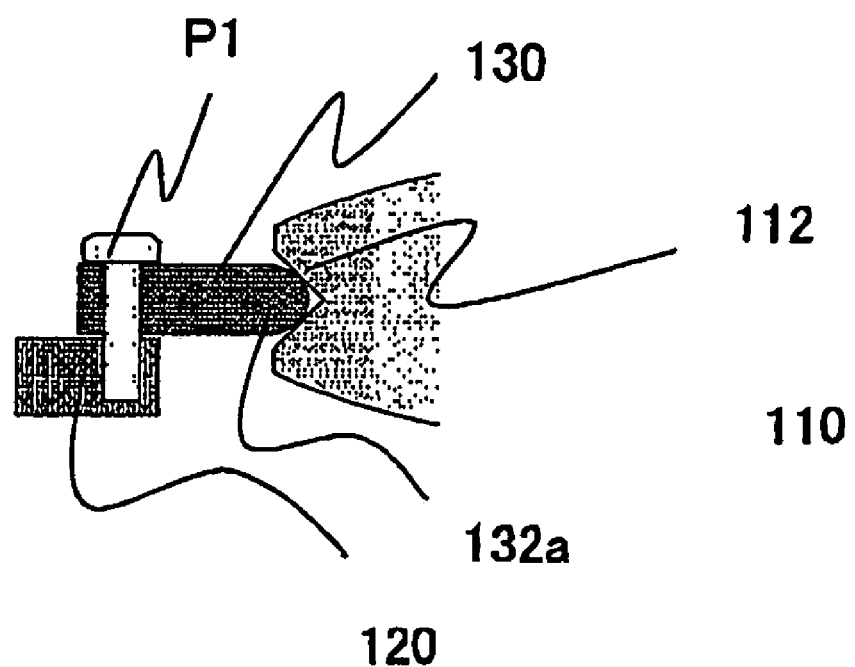
FIG. 4 is a schematic block view of the exemplary exposure apparatus according to the present invention.

FIG. 3 shows an enlarged exploded perspective view of the support part 130 shown in FIG. 1. The support part 130 has, as shown in FIG. 3, a contact part 132 for contacting the optical element 110's groove 112 to support the optical element 110 at three points via the groove 112. In other words, the support part 130 is arranged at three points on the cell member 120 at approximately regular intervals around the optical axis. The support parts 130 are distributed on the optical element 110 in its circumferential direction at approximately regular intervals, and stably support the optical element 110. The contact part 132 at the tip of the support part 130 forms, for example, a spherical absorption member 132a to support the optical element 110 and contacts the sectionally V-shaped groove 112 at its two points as shown in FIG. 4, without damaging the optical element 110. Therefore, the optical element 110 is positioned in the optical-axis (or vertical) direction without being excessively restrained. Here, FIG. 4 is a schematic sectional view showing a contact state between the groove 112 in the optical element 110 and the absorption member 132a of the support member 130.

Figure 5:
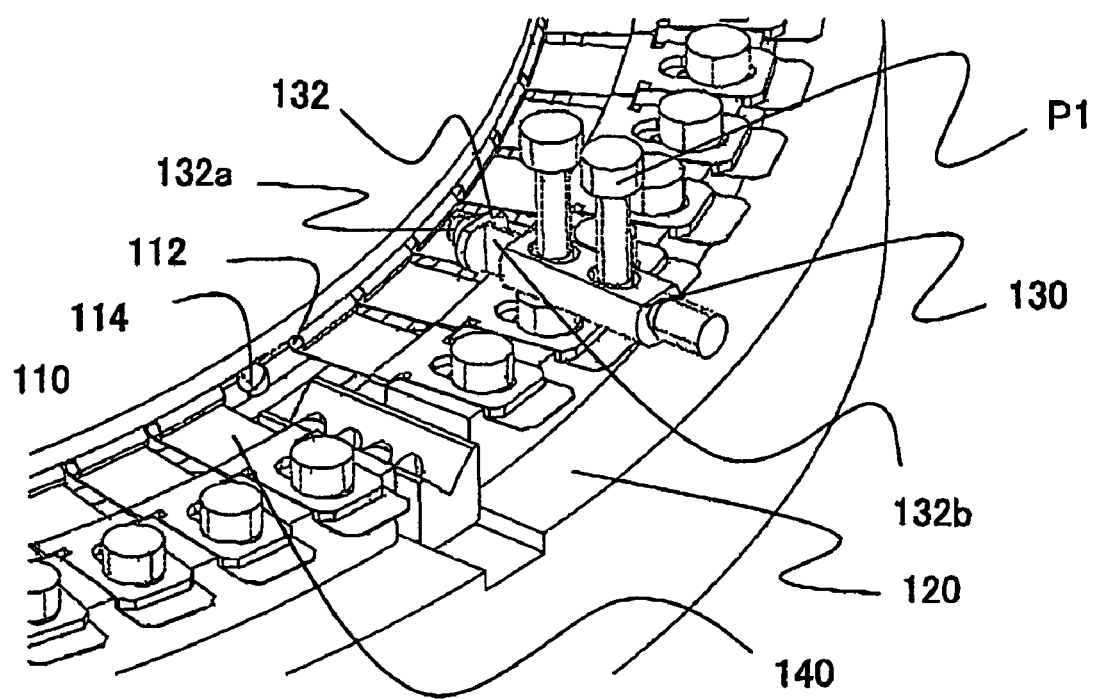
FIG. 5 is an enlarged exploded perspective view of the support member shown in FIG. 1.

As shown in FIG. 5, three cone-shaped hole 114 each corresponding to the spherical absorption member 132a may be provided at regular intervals on the outer circumferential side surface of the optical element 110 to allow the absorption members 132a of the support member 130 to contact the holes 114. In this case, at least one of three support members 130 preferably has the contact part 132 (and the absorption member 132a) which includes a spring mechanism 132b that is deformable in a radial direction of the optical element 110, in order to avoid deformations of the optical element 110 due to excessive restraints. Here, FIG. 5 is an enlarged exploded perspective view of the support part 130 shown in FIG. 1. The support part 130 is connected to the cell member 120 via a pin P1.

Figure 6:
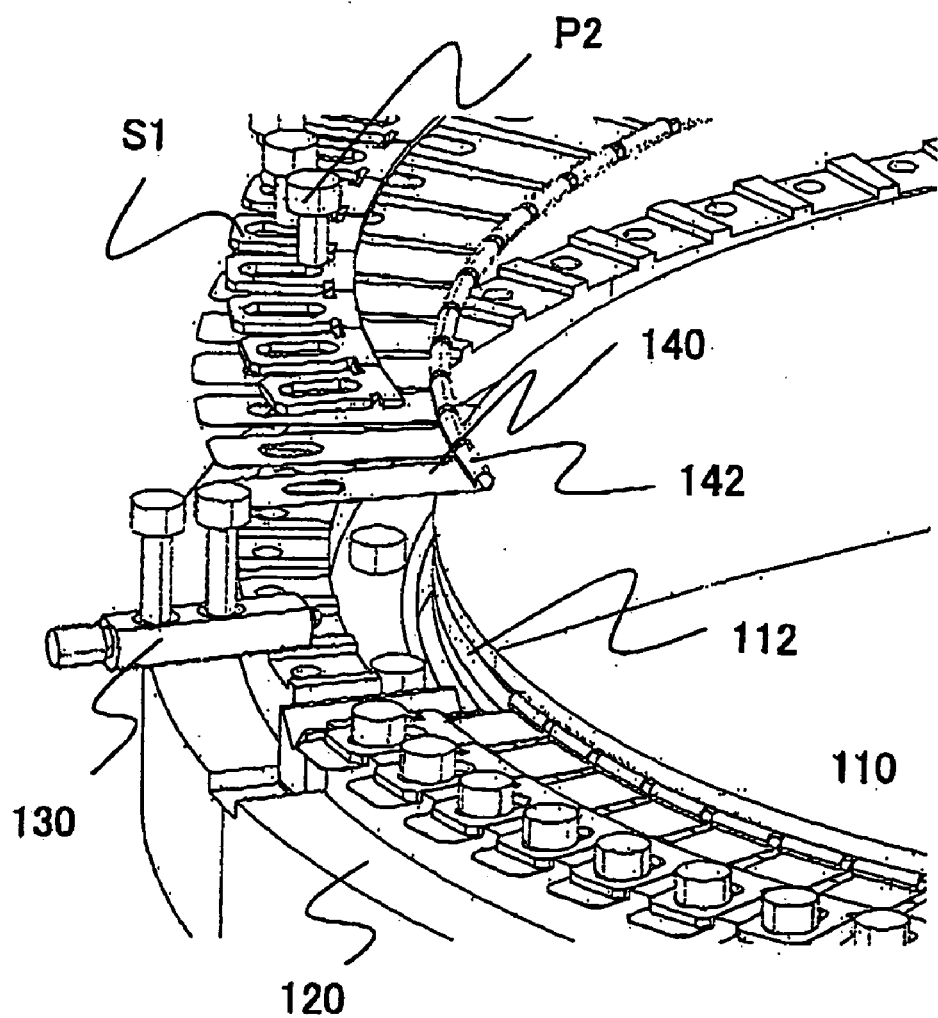
FIG. 6 is an enlarged exploded perspective view of an elastic member shown in FIG. 1.

The elastic members 140 are provided among three support members 130. At least one (preferably plural) elastic members 140 are provided between two adjacent support members along the peripheral part of the optical element. The elastic members 140 apply an elastic force in the antigravity direction and a direction perpendicular to the antigravity direction. The elastic member 140 is coupled to the cell member 120 via the pin P2 and the spacer S1 as shown in FIG. 6. It is preferable that the elastic member elastically deforms in the antigravity or gravity direction (or along an optical-axis direction of the optical element 110), and does not elastically deform in the horizontal direction (or a radial direction of the optical element 110). Alternatively, it is preferable that the elastic member deforms only in a predetermined direction, which is substantially the antigravity or gravity direction (or an optical-axis direction of the optical element 110), or an angle between the predetermined direction and the antigravity or gravity direction is within 50. The elastic member 140 is made, for example, of a flat spring. FIG. 6 is an enlarged exploded perspective view of the elastic member 140 shown in FIG. 1.

The elastic member 140 has a forcing surface 142 that has a curvature to contact the sectionally V-shaped groove 112 in the optical element 110 and applies an elastic force to the optical element 110 in the antigravity direction and the direction perpendicular to the antigravity direction. The forcing surface 142 is formed by bending a tip of the elastic member 140 (i.e., a part that contacts the groove 112 in the optical element 110) in a pipe shape. The elastic member 140 is positioned in the optical-axis direction and fixed against the cell member 120 so that two outer circumferential points on the pipe-shaped forcing surface 142 contact the sectionally V-shaped groove 112 in the optical element 110. A position of the elastic member 140 is adjustable by changing the height of the cell member 120 in the optical-axis direction or the height of a spacer in the optical-axis direction, which is provided between the cell member 120 and the elastic member 140.

Figure 7:
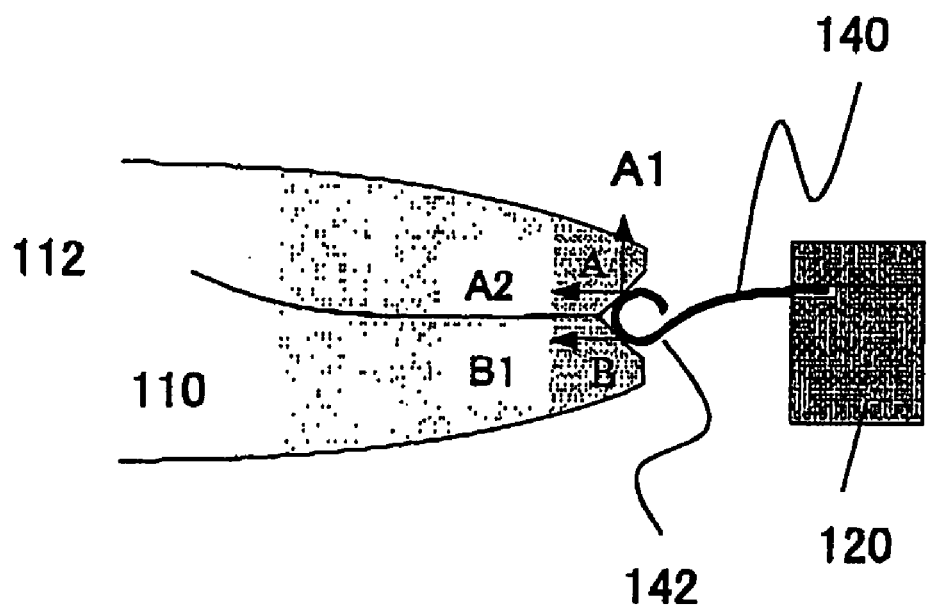
FIG. 7 is a schematic sectional view showing a contact state between a groove in an optical member and a forcing surface of the elastic member.

The elastic member displaces in the gravity direction, and provides the elastic force in the antigravity direction. The elastic member 140 applies an elastic force to the elastic element 110 in the antigravity direction and the direction perpendicular to the antigravity direction via the contact points A and B, at which the elastic member 140 contacts the groove 112 in the optical element 110. At the point A, the elastic force in the antigravity direction, which occurs as the elastic member 140 displaces in the gravity direction, is applied to the optical element 110 via the forcing surface 142 after divided into an elastic force A1 in the antigravity direction and an elastic force A2 in the direction perpendicular to the antigravity direction. At the point B, the force necessary for the elastic member 140 (for example, a weight of the optical element 110) to displace in the gravity direction is applied to the optical element 110 via the forcing surface 142 after divided by the groove 112 in the optical element 110 into an elastic force B1 in the direction perpendicular to the antigravity direction. Here, FIG. 7 is a schematic sectional view showing a contact state between the groove 112 in the optical member 110 and the forcing surface 142 of the elastic member 140. Therefore, the elastic force A1 applied to the optical element 110 by the elastic member 140 pushes up the optical element 110 in the antigravity direction, and the elastic forces A2 and B1 applied to the optical element 110 by the elastic member 140 position the optical element 110 in a direction perpendicular to the optical-axis direction or a lateral direction.

A sum of the elastic forces A1 applied by the elastic members 140 is equal to the weight of the optical element. In other words, the gravity deformation of the optical element 110 can be reduced, if a load P of the elastic force A1 applied by each elastic member 140 is set so that Equation 1 below is met, where n is the number of elastic members 140, and M is the weight of the optical element 110.

$$F = M/n \qquad (1)$$

Using the above structure, the retainer 100 positions the optical element 110 mainly in the optical-axis direction through the support members 130 and mainly in the directions perpendicular to the optical axis through the elastic members 140. The elastic members 140 that support the dispersed weight of the optical element 110 can minimize the gravity deformations that are not rotationally symmetrical with respect to the optical axis, and reduce the aberration that results from the deformation and positional offset of the optical element 110, which otherwise deteriorates the imaging performance, and consequently realizing the desired optical performance.

If the optical element 110 is subject to the acceleration in the direction perpendicular to the optical-axis direction, the elastic member 140 receives the load. However, the elastic member 140 contacts the groove 112 at two points A and B via the forcing surface 142, and restrains displacements in the optical-axis direction. As a consequence, the optical element 110 becomes high rigid in the acceleration direction, and does not offset in the lateral direction.

While the instant embodiment forms the tip of the forcing surface 142 of the elastic member 140 into a pipe shape, cylindrical or spherical shape would also provide similar effects. While 69 elastic members 140 are provided to fill spaces among three support members 130, this number is exemplary and at least one elastic member 140 is provided between two adjacent support members 130 so that these elastically members 140 are arranged at regular intervals. The elastic member 140 may include two members, one for applying an elastic force in the antigravity direction, and the other for applying an elastic force in the direction perpendicular to the antigravity direction.

Figure 8:
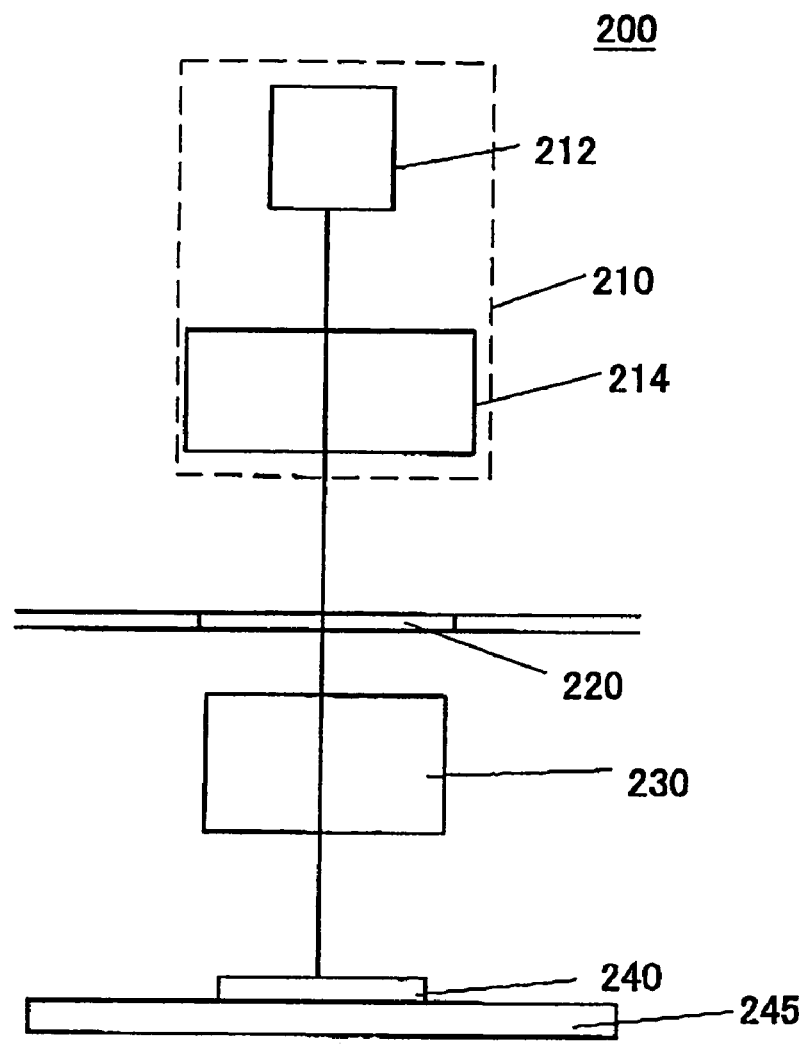
FIG. 8 is a schematic structure of an exemplary inventive exposure apparatus.

Referring now to FIG. 8, a description will be given of the projection optical system 230 to which the inventive retainer 100 is applied and the exposure apparatus 200 having the same. Here, FIG. 8 is a schematic block diagram of the inventive illustrative exposure apparatus 200. The exposure apparatus 200 includes, as shown in FIG. 8, an illumination apparatus 210 for illuminating a mask 220 which forms a circuit pattern, a projection optical system 230 that projects diffracted light created from the illuminated mask pattern onto a plate 240, and a stage 245 for supporting the plate 240.

The exposure apparatus 200 is a projection exposure apparatus that exposes onto the plate 240 a circuit pattern created on the mask 220, e.g., in a step-and-repeat or a step-and-scan manner. Such an exposure apparatus is suitable for a sub-micron or quarter-micron lithography process, and this embodiment exemplarily describes a step-and-scan exposure apparatus (which is also called "a scanner"). "The step-and-scan manner", as used herein, is an exposure method that exposes a mask pattern onto a wafer by continuously scanning the wafer relative to the mask, and by moving, after a shot of exposure, the wafer stepwise to the next exposure area to be shot. "The step-and-repeat manner" is another mode of exposure method that moves a wafer stepwise to an exposure area for the next shot every shot of cell projection onto the wafer.

The illumination apparatus 210 illuminates the mask 220 which forms a circuit pattern to be transferred, and includes a light source unit 212 and an illumination optical system 214.

The light source unit 212 uses as a light source, for example, as ArF excimer laser with a wavelength of approximately 193 nm, a KrF excimer laser with a wavelength of approximately 248 nm and $F_2$ excimer laser with a wavelength of approximately 153 nm, but the a type of laser is not limited to excimer laser and a YAG laser may be, for example. Similarly, the number of laser units is not limited. A EUV light source is also applicable. For example, two independently acting solid lasers would cause no coherence between these solid lasers and reduces speckles resulting from the coherence. An optical system for reducing speckles may swing linearly or rotationally. When the light source unit 212 uses laser, it is desirable to employ a beam shaping optical system that shapes a parallel beam from a laser source to a desired beam shape, and an incoherently turning optical system that turns a coherent laser beam into an incoherent one. A light source applicable to the light source unit 212 is not limited to a laser, and may use one or more lamps such as a mercury lamp and a xenon lamp.

The illumination optical system 214 is an optical system that illuminates the mask 220, and includes a lens, a mirror, a light integrator, a stop, and the like, for example, a condenser lens, a fly-eye lens, an aperture stop, a condenser lens, a slit, and an image-forming optical system in this order. The illumination optical system 214 can use any light whether it is axial or non-axial light. The light integrator may include a fly-eye lens or an integrator formed by stacking two sets of cylindrical lens array plates (or lenticular lenses), and be replaced with an optical rod or a diffractive element. The inventive retainer 100 may be used to hold the optical element, such as a lens in the illumination optical system 214.

The mask 220 is made, for example, of quartz, forms a circuit pattern (or an image) to be transferred, and is supported and driven by a mask stage (not shown). Diffracted light emitted from the mask 220 passes the projection optical system 230, thus and then is projected onto the plate 240. The mask 220 and the plate 240 are located in an optically conjugate relationship. Since the exposure apparatus 200 of this embodiment is a scanner, the mask 220 and the plate 240 are scanned at the speed ratio of the reduction ratio of the projection optical system 230, thus transferring the pattern on the mask 220 to the plate 240. If it is a step-and-repeat exposure apparatus (referred to as a "stepper"), the mask 220 and the plate 240 stand still in exposing the mask pattern.

The projection optical system 230 may use an optical system solely including a plurality of lens elements, an optical system including a plurality of lens elements and at least one concave mirror (a catadioptric optical system), an optical system including a plurality of lens elements and at least one diffractive optical element such as a kinoform, and a full mirror type optical system, and so on. Any necessary correction of the chromatic aberration may use a plurality of lens units made from glass materials having different dispersion values (Abbe values), or arrange a diffractive optical element such that it disperses in a direction opposite to that of the lens unit.

The inventive retainer 100 may be used to hold the optical element, such as a lens in the projection optical system 230. The retainer 100 is connected to the lens barrel 232 in the projection optical system 230 through the spring member 122 that is provided on the cell member 120, and may absorb a deformation in a radial direction. This structure may prevent the cell member 120 from decentering due to a relative displacement between the lens barrel and the cell member 120, which relative displacement results from different coefficients of linear expansion between them, when the temperature environment changes, for example, in carrying the apparatus. The projection optical system 230 may achieve desired optical performance by reducing the aberration that results from the deformation and positional offset of the optical element 110 which otherwise deteriorates imaging performance.

The plate 240 is an object to be exposed such as a wafer and a liquid crystal plate, and photoresist is applied onto it. A photoresist application step includes a pretreatment, an adhesion accelerator application treatment, a photoresist application treatment, and a pre-bake treatment. The pretreatment includes cleaning, drying, etc. The adhesion accelerator application treatment is a surface reforming process so as to enhance the adhesion between the photo-resist and a base (i.e., a process to increase the hydrophobicity by applying a surface active agent), through a coat or vaporous process using an organic film such as HMDS (Hexamethyl-disilazane). The pre-bake treatment is a baking (or burning) step, softer than that after development, which removes the solvent.

The stage 245 supports the plate 240. The stage 240 may use any structure known in the art, and a detailed description of its structure and operation is omitted. The stage 245 may use, for example, a linear motor to move the plate 240 in XY directions. The mask 220 and plate 240 are, for example, scanned synchronously, and the positions of the stage 245 and a mask stage (not shown) are monitored, for example, by a laser interferometer and the like, so that both are driven at a constant speed ratio. The stage 245 is installed on a stage stool supported on the floor and the like, for example, via a damper, and the mask stage and the projection optical system 230 are installed on a lens barrel stool (not shown) supported, for example, via a damper to the base frame placed on the floor.

In exposure, light emitted from the light source 212, e.g., Koehler-illuminates the mask 220 via the illumination optical system 214. Light that passes through the mask 220 and reflects the mask pattern is imaged onto the plate 240 by the projection optical system 230. The projection optical system 230 and/or the illumination optical system 214 used for the exposure apparatus 200 include an optical element held by the inventive retainer 100, and reduce the deformation and the aberration resulting from the positional offset of the optical element, thus being able to provide high-quality devices (such as semiconductor devices, LCD devices, photographing devices (such as CCDs, etc.), thin film magnetic heads, and the like).

Figure 9:
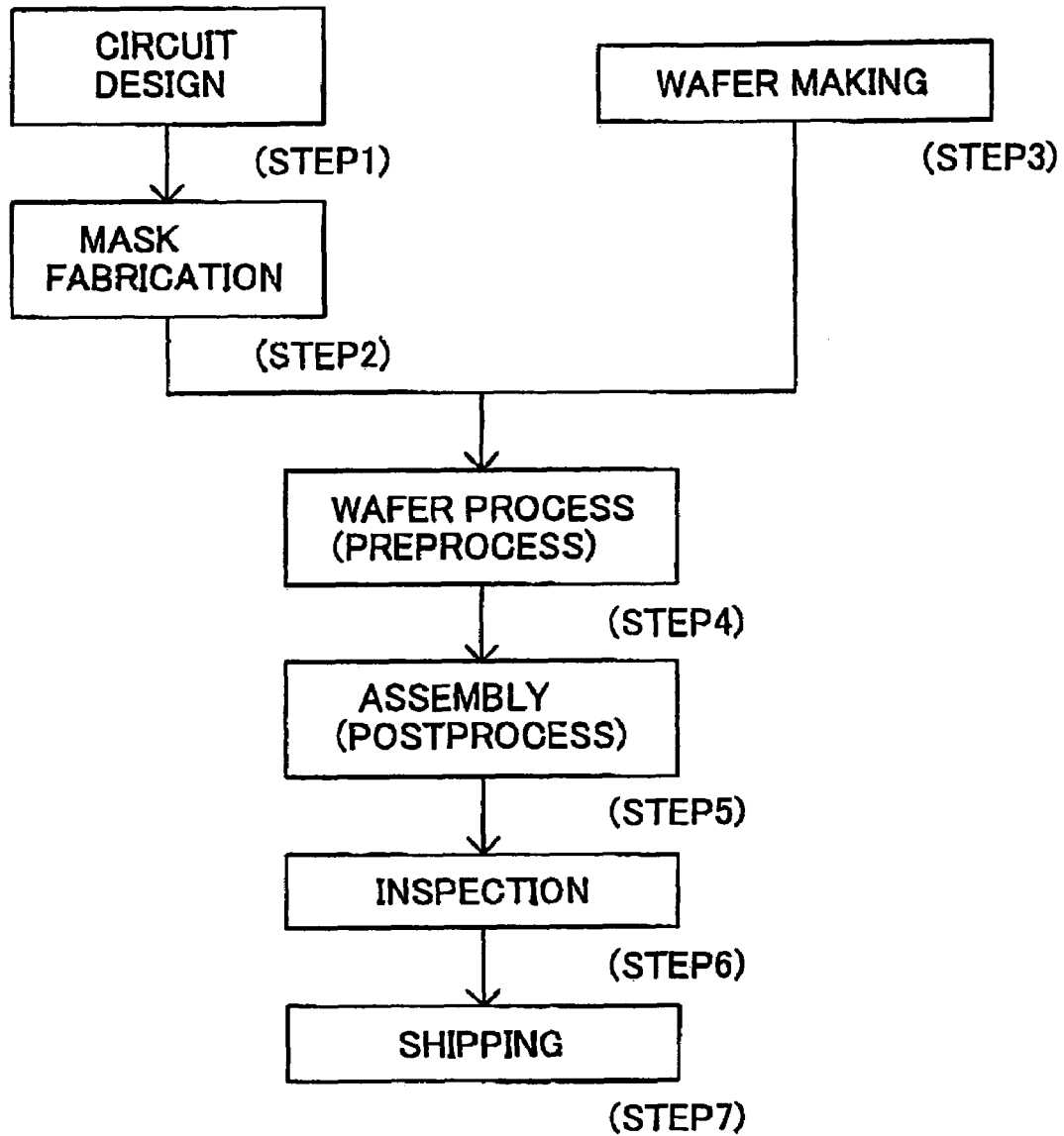
FIG. 9 is a flowchart for explaining how to fabricate devices (such as semiconductor chips such as ICs and LCDs, CCDs, and the like).
Figure 10:
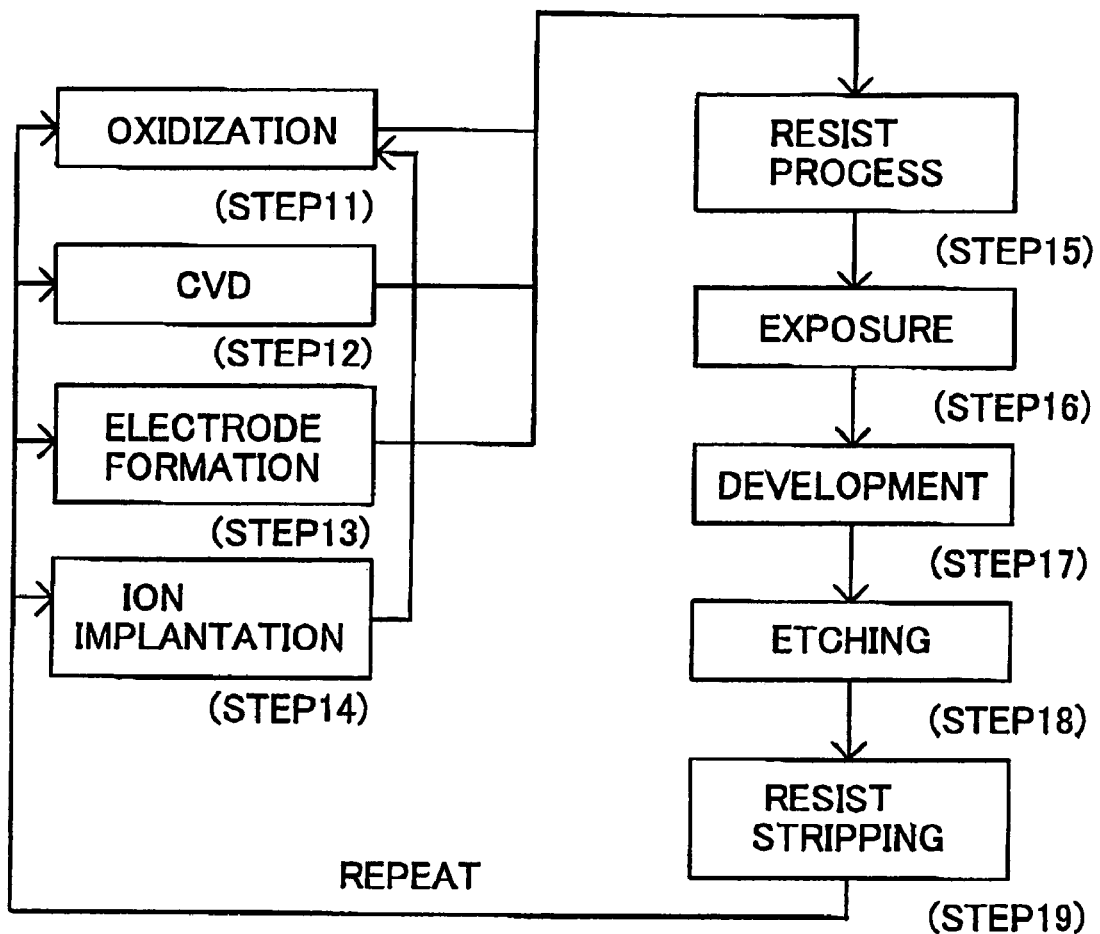
FIG. 10 is a detail flowchart of a wafer process as Step 4 shown in FIG. 9.
Figure 11:
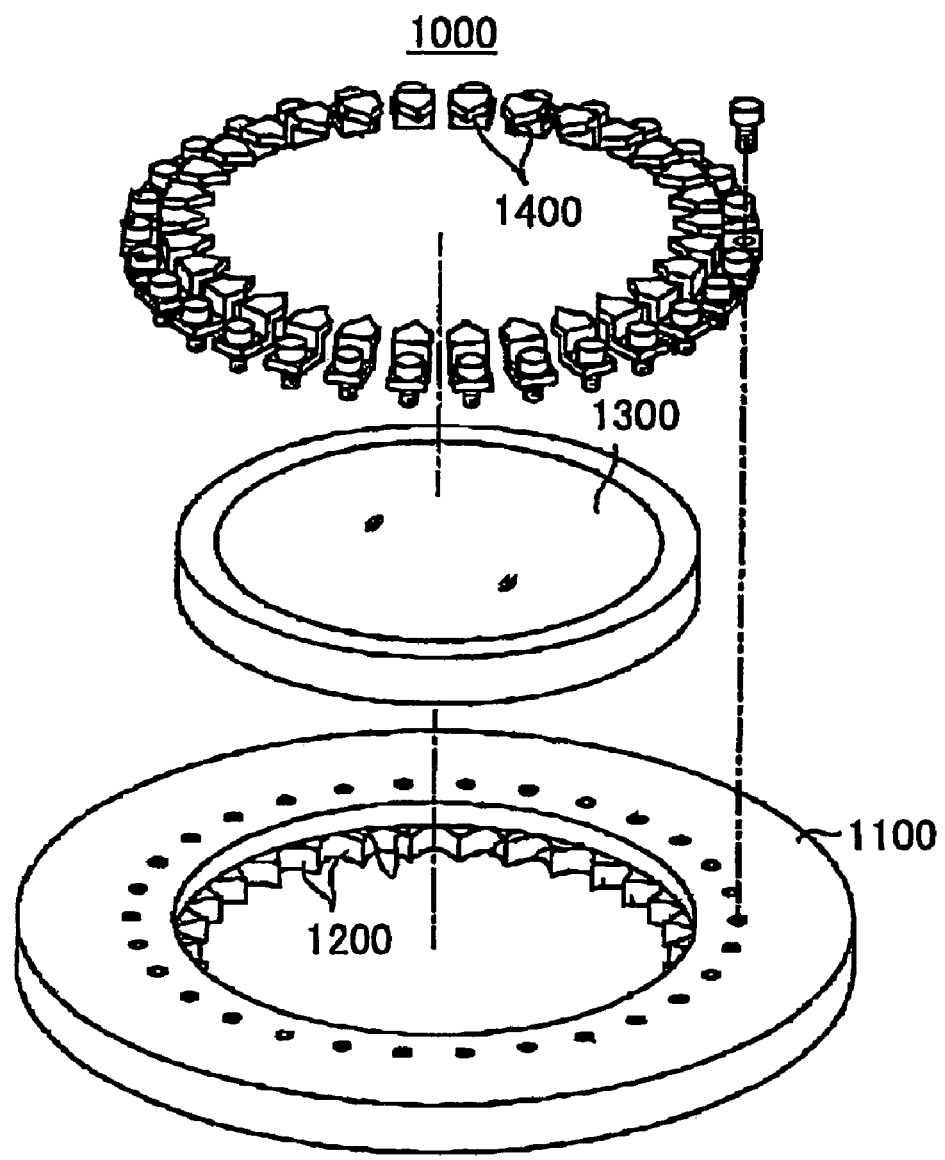
FIG. 11 is an exploded perspective view of a conventional exemplary retainer.
Figure 12:
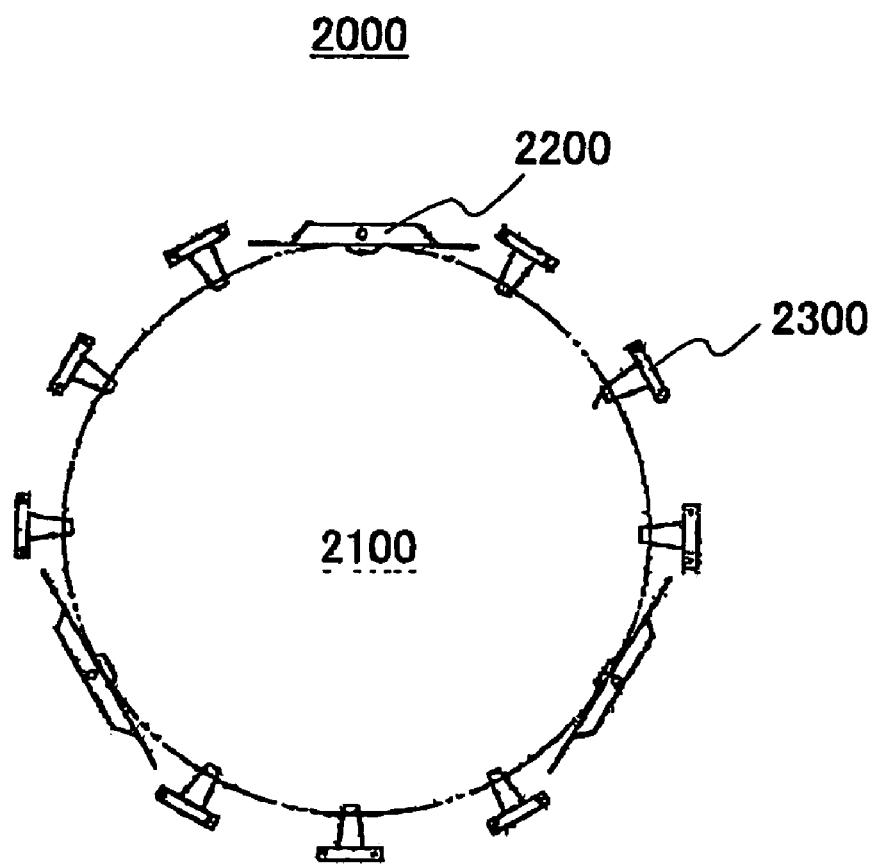
FIG. 12 is a schematic top transparent view of another conventional exemplary retainer.

Referring now to FIGS. 9 and 10, a description will be given of an embodiment of a device fabrication method using the above exposure apparatus 200. FIG. 9 is a flowchart for explaining how to fabricate devices (i.e., semiconductor chips such as IC and LSI, LCDs, CCDS, and the like). Here, a description will be given of the fabrication of a semiconductor chip as an example. Step 1 (circuit design) designs a semiconductor device circuit. Step 2 (mask fabrication) forms a mask having a designed circuit pattern. Step 3 (wafer making) manufactures a wafer using materials such as silicon. Step 4 (wafer process), which is also referred to as a pretreatment, forms actual circuitry on the wafer through lithography using the mask and wafer. Step 5

(assembly), which is also referred to as a post-treatment, forms into a semiconductor chip the wafer formed in Step 4 and includes an assembly step (e.g., dicing, bonding), a packaging step (chip sealing), and the like. Step 6 (inspection) performs various tests for the semiconductor device made in Step 5, such as a validity test and a durability test. Through these steps, a semiconductor device is finished and shipped (Step 7).

FIG. 10 is a detailed flowchart of the wafer process in Step 4. Step 11 (oxidation) oxidizes the wafer's surface. Step 12 (CVD) forms an insulating film on the wafer's surface. Step 13 (electrode formation) forms electrodes on the wafer by vapor disposition and the like. Step 14 (ion implantation) implants ions into the wafer. Step 15 (resist process) applies a photosensitive material onto the wafer. Step 16 (exposure) uses the exposure apparatus 200 to expose a circuit pattern on the mask onto the wafer. Step 17 (development) develops the exposed wafer. Step 18 (etching) etches parts other than a developed resist image. Step 19 (resist stripping) removes disused resist after etching. These steps are repeated, and multi-layer circuit patterns are formed on the wafer. Use of the device fabrication method in this embodiment can manufacture higher-quality devices than the conventional method.

Further, the present invention is not limited to these preferred embodiments and various variations and modifications may be made without departing from the scope of the present invention. For example, the inventive retainer may be used to hold various optical elements, such as a lens, mirror, and filter. The inventive retainer may be used to hold a mask and a wafer.

According to the inventive retainer, the dispersed stress applied to the optical element may provide a minimum stress to position the optical element in a direction perpendicular to the optical axis of the optical element without breaking the optical element, as well as holding the optical element while restraining its gravity deformation.

What is claimed is:

1. A retainer comprising:
   a plurality of support members for supporting an optical element; and
   a plurality of elastic members arranged among the plurality of support members, each elastic member applying an elastic force to the optical element in a direction perpendicular to a gravity direction,
   wherein the optical element has a sectionally V-shaped groove in a side surface, and wherein the elastic member has a forcing surface for applying the elastic force, the forcing surface is so curved that said elastic member contacts the sectionally V-shaped groove at two points.

2. A retainer comprising:
   a plurality of support members for supporting an optical element; and
   a plurality of elastic members arranged among the plurality of support members, each elastic member applying an elastic force to the optical element in a direction perpendicular to a gravity direction,
   wherein a sum of the elastic forces applied by said elastic members in the direction opposing to the gravity direction is equal to a weight of the optical element.

3. A retainer comprising:
   a plurality of support members for supporting an optical element; and
   a plurality of elastic members arranged among the plurality of support members, each elastic member applying an elastic force to the optical element in a direction perpendicular to a gravity direction,
   wherein there are three support members and three elastic members, and each elastic member is provided between two adjacent support members.

4. A retainer according to claim 3, wherein the three support members are arranged at 1200 pitches.

* * * * *